(12) United States Patent
Jin

(10) Patent No.: US 10,206,111 B2
(45) Date of Patent: Feb. 12, 2019

(54) WIRELESS LOCAL AREA NETWORK USER-SIDE DEVICE AND INFORMATION PROCESSING METHOD

(71) Applicant: Huawei Technologies Co., Ltd., Shenzhen (CN)

(72) Inventor: Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/294,485

(22) Filed: Oct. 14, 2016

(65) Prior Publication Data
US 2017/0034704 A1   Feb. 2, 2017

Related U.S. Application Data

(63) Continuation of application No. PCT/CN2014/075643, filed on Apr. 17, 2014.

(51) Int. Cl.
*H04W 12/08* (2009.01)
*H04W 48/14* (2009.01)
*H04W 84/12* (2009.01)

(52) U.S. Cl.
CPC .......... *H04W 12/08* (2013.01); *H04W 48/14* (2013.01); *H04W 84/12* (2013.01)

(58) Field of Classification Search
CPC ... H04L 41/0806; H04L 47/10; H04L 41/065; H04L 41/5022; H04L 41/0893;
(Continued)

(56) References Cited

U.S. PATENT DOCUMENTS

2012/0076117 A1  3/2012  Montemurro et al.
2013/0040629 A1  2/2013  Sprigg et al.
(Continued)

FOREIGN PATENT DOCUMENTS

| CN | 1949715 A | 4/2007 |
|---|---|---|
| CN | 101827365 A | 9/2010 |
| CN | 101883180 A | 11/2010 |
| CN | 103188227 A | 7/2013 |
| CN | 103516681 A | 1/2014 |

(Continued)

OTHER PUBLICATIONS

"Recommendations for Minimal Wi-Fi Capabilities of Terminals, Version 2.0," pp. 1-46, GSM Association (Sep. 20, 2013).
(Continued)

*Primary Examiner* — Nizar N Sivji
(74) *Attorney, Agent, or Firm* — Leydig, Voit & Mayer, Ltd.

(57) ABSTRACT

The present invention relates to the field of wireless communications technologies, and in particular, to a wireless local area network (WLAN) user-side device and an information processing method, to resolve a problem that user equipment (UE) cannot accurately select a WLAN network because current network information of a WLAN is not complete. Embodiments of the present invention provide a WLAN user-side device, including: a first processing module, configured to receive network class information of a WLAN sent by a WLAN network-side device, and a second processing module, configured to determine, according to the network class information received by the first processing module, a manner of using the WLAN by UE corresponding to the user-side device. Because the user-side device obtains the network class information of the WLAN, the user-side device can determine, according to the network
(Continued)

class information of the WLAN, the manner of using the WLAN by the UE.

20 Claims, 2 Drawing Sheets

(58) Field of Classification Search
CPC .... H04L 41/5038; H04L 47/20; H04W 84/12; H04W 84/18; H04W 40/28; H04W 12/08; H04W 72/087; H04W 48/14; G09B 7/02; G09B 7/00
See application file for complete search history.

(56) References Cited

U.S. PATENT DOCUMENTS

| | | | |
|---|---|---|---|
| 2013/0132567 A1 | 5/2013 | Jiang et al. | |
| 2014/0071854 A1* | 3/2014 | Xiang | H04W 48/16 370/254 |
| 2014/0136607 A1 | 5/2014 | Ou et al. | |
| 2015/0105049 A1* | 4/2015 | Golaup | H04L 63/0892 455/411 |
| 2017/0220692 A1* | 8/2017 | Greenwood | G06F 17/30867 |

FOREIGN PATENT DOCUMENTS

| | | |
|---|---|---|
| JP | 2013539307 A | 10/2013 |
| WO | 2013160673 A1 | 10/2013 |
| WO | WO 2015118394 A1 | 8/2015 |

OTHER PUBLICATIONS

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 9: Interworking with External Networks," IEEE Computer Society, IEEE Std 802.11u-2011, The Institute of Electrical and Electronics Engineers, New York, New York (Feb. 25, 2011).

* cited by examiner

WIRELESS LOCAL AREA NETWORK USER-SIDE DEVICE AND INFORMATION PROCESSING METHOD

CROSS-REFERENCE TO RELATED APPLICATIONS

This application is a continuation of International Application No. PCT/CN2014/075643, filed on Apr. 17, 2014, the disclosure of which is hereby incorporated by reference in its entirety.

TECHNICAL FIELD

The present invention relates to the field of wireless communications technologies, and in particular, to a wireless local area network user-side device and an information processing method.

BACKGROUND

In recent years, rapid popularization of smart terminals and mobile applications promotes fast development of a mobile internet, but imposes an impact of a large data volume on a mobile network, and therefore, mobile networks of global operators are frequently overloaded. A wireless local area network (WLAN) whose spectrum is free, and device is inexpensive, and terminal popularization and technology development are fast is favored by operators, enterprises, governments, and consumers, and provides a great option of wireless access by a terminal to the mobile internet.

The Wi-Fi Alliance (WFA), as a technology standardization and promotion organization of commercial WLANs, aims to bring a standardized WLAN based Hotspot 2.0 network to the market. In the Hotspot 2.0 network, by means of a Passpoint technology, a network can be automatically discovered and selected, and roaming can be implemented between networks of different mobile network operators.

A basic architecture of Hotspot 2.0 (briefly referred to as "HS2.0" below) is shown in FIG. 1. A Passpoint device is connected to an edge router by using a Passpoint access point (AP) provided by a Passpoint hotspot operator, and then accesses the Internet by using an access router. By means of an extended Institute of Electrical and Electronics Engineers (IEEE) mechanism, the Passpoint device sends an Access Network Query Protocol (ANQP) query message to an ANQP server by using the Passpoint access point, to obtain network information of a WLAN, and selects a proper WLAN network according to configuration of the Passpoint device or an operator policy for access. Content of the ANQP query message is shown in Table 1 below.

TABLE 1

Generic Advertisement Service (Generic Advertisement Service, GAS) (ANQP) query information based on the IEEE 802.11u

| Information name in English (Information name) | Meaning |
|---|---|
| Reserved | Reserved |
| ANQP Query list | ANQP query list |
| ANQP Capability list | ANQP capability list |
| Venue Name information | Venue name information |
| Emergency Call Number information | Emergency call number information |
| Network Authentication Type information | Network authentication type information |
| Roaming Consortium list | Roaming consortium list |
| IP Address Type Availability information | IP Address Type Availability information |
| NAI Realm list | Network access identifier realm list |
| 3GPP Cellular Network information | 3rd Generation Partnership Project cellular network information |
| AP Geospatial Location | Access point geospatial location |
| AP Civic Location | Access point civic location |
| AP Location Public Identifier URI | Access point location public identifier uniform resource identifier |
| Domain Name list | WLAN network provider domain name list |
| Emergency Alert Identifier URI | Emergency alert identifier uniform resource identifier |
| Emergency NAI | Emergency network access identifier |
| Reserved | Reserved |
| ANQP vendor-specific list | ANQP vendor-specific list |
| Reserved | Reserved |

At present, network information obtained by a Passpoint device, which is referred to as user equipment (User equipment, UE) below, from a WLAN AP by means of an ANQP query includes:
a Venue Name (venue name),
a Network Authentication Type (network authentication type),
a Roaming Consortium (roaming consortium),
IP Address Type Availability (IP address type availability),
an NAI Realm (network access identifier realm),
a 3GPP Cellular Network (3rd Generation Partnership Project cellular network),
a Domain Name (WLAN network operating entity domain name), and
HS2.0 ANQP-elements (ANQP-elements):
an HS Query list (hotspot query list),
an HS Capability list (hotspot capability list),
an Operator Friendly Name (WLAN network operator friendly name),
WAN Metrics (wide area network information),
a Connection Capability (a WLAN network protocol and a connection capability of a port),
an NAI Home Realm Query (a network access identifier home realm query),
an OSU Providers list (online signup providers list),
an Icon Request (icon request), and
an Icon Binary File (icon binary file).

In addition, there is still some other information, which is obtained by the UE by using a beacon (Beacon) frame or a probe response (Probe Response) of the WLAN AP, for example, a BSS Load element (business support system load element), EAP methods (Extensible Authentication Protocol methods), support for HS2.0 (support for HS2.0), and some Roaming Consortiums (roaming consortiums).

The network may further control the UE to perform WLAN network selection by sending configuration information (PerProviderSubscription) to the UE, where the configuration information includes user subscription related information (subscription update, a home service provider, a subscription parameter, a credential, and the like), and further includes a policy used to specifically select a WLAN AP. The UE may select, according to the configuration information of the network, a proper WLAN network for access.

Currently, the UE may obtain, by means of an ANQP query, information about WLAN networks, for example, a Venue Name (venue name), a Network Authentication Type (network authentication type), a Roaming Consortium (roaming consortium), IP Address Type Availability (available IP address type), an NAI Realm (network access identifier realm), 3GPP Cellular Network (3GPP cellular network information), a Domain Name (WLAN network operating entity domain name), an Operator Friendly Name (WLAN network operator friendly name), WAN Metrics (wide area network connection information), a Connection Capability (a WLAN network protocol and a connection status of a port), an NAI Home Realm Query (information returned by means of a network access identifier home realm query), and an OSU Providers list (online signup Providers list).

It may be found that the information does not indicate complete information about the WLAN network. Therefore, the network information obtained by the UE is not complete, and the UE cannot accurately determine a manner of using the WLAN network (for example, whether to access the WLAN or whether to run a specified application in the WLAN).

SUMMARY

Embodiments of the present invention provide a wireless local area network user-side device and an information processing method, to resolve a problem that UE cannot accurately select a WLAN network because current network information of a WLAN network is not complete.

According to a first aspect, an embodiment of the present invention provides a WLAN user-side device, where the user-side device includes:
  a first processing module, configured to receive network class information of a WLAN sent by a wireless local area network WLAN network-side device, and
  a second processing module, configured to determine, according to the network class information received by the first processing module, a manner of using the WLAN by user equipment UE corresponding to the user-side device.

In this solution, because the user-side device obtains the network class information of the WLAN, the user-side device can determine, according to the network class information of the WLAN, the manner of using the WLAN by the UE, thereby resolving a problem that UE cannot accurately select a WLAN network because current network information is not complete.

With reference to the first aspect, in a first possible implementation manner, the second processing module is specifically configured to:
  determine, according to the network class information and class information of a user using the UE, whether the UE is to access the WLAN.

In this solution, the class information of the user of the UE is further used together with the received network class information, so that it can be more accurately determined whether the UE is to access the WLAN.

With reference to the first possible implementation manner of the first aspect, in a second possible implementation manner, the first processing module is further configured to:
  receive the class information of the user of the UE in PerProviderSubscription sent by the WLAN network-side device.

This solution provides a manner of obtaining the class information of the user of the UE from the WLAN network-side device.

With reference to the first possible implementation manner of the first aspect or the second possible implementation manner of the first aspect, in a third possible implementation manner, the class information of the user of the UE received by the first processing module includes any one of the following information:
  information used to indicate that the user of the UE is an adult;
  information used to indicate that the user of the UE is a juvenile;
  information used to indicate that the user of the UE is a child;
  information used to indicate an age group of the user of the UE; or
  information used to indicate that the user of the UE is a student.

This solution provides optional solutions of the class information of the user of the UE.

With reference to the first aspect, in a fourth possible implementation manner, the second processing module is specifically configured to:
  determine, according to the network class information, and a class of an application run on the UE or a class of a website or a website address to be accessed by an application run on the UE, whether the UE is to access the WLAN or run the application in the WLAN.

In this solution, the class of the application run on the UE is used together with the received network class information, to determine whether the UE is to access the WLAN or run the application in the WLAN, and the manner of using the WLAN by the UE may be determined according to the application run on the UE.

With reference to the fourth possible implementation manner of the first aspect, in a fifth possible implementation manner, the second processing module is specifically configured to:
  access, by using the application run on the UE, an application programming interface API that is provided by an operating system of the UE and that is used to query the network class information of the WLAN, to obtain the network class information of the WLAN received by the first processing module; and determine, according to the obtained network class information, whether the UE is to access the WLAN or run the application in the WLAN; or
  determine, according to the network class information received by the first processing module and by using an operating system of the UE, whether the UE is to access the WLAN or run the application in the WLAN.

This solution provides a specific manner of determining whether the UE is to access the WLAN or run the application in the WLAN.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the first processing module is specifically configured to:
  after sending, to the WLAN network-side device, an Access Network Query Protocol ANQP query request for querying the network class information of the WLAN, receive the network class information by using an ANQP query response that is sent by the WLAN network-side device in response to the ANQP query request, or receive the network class information by using a beacon Beacon frame or a probe response Probe Response.

This solution provides a specific implementation manner of obtaining the network class information of the WLAN by the user-side device.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner of the first aspect, the network class information includes one or more of the following information:

a banking level banking level, security transport security transport, no security assured No security assured, a level that access by a child is allowed child level, non-child access protection Non-child protection, age class Under1X, access to an access point being monitored Monitoring, no monitoring No Monitoring, or access to an access point being protected by a firewall Firewall protected.

This solution provides optional solutions of the network class information for different scenarios.

According to a second aspect, an embodiment of the present invention provides an information processing method, where the method includes:

receiving network class information of a WLAN sent by a wireless local area network WLAN network-side device, and determining, according to the received network class information, a manner of using the WLAN by user equipment UE.

In this solution, because the user-side device obtains the network class information of the WLAN, the user-side device can determine, according to the network class information of the WLAN, the manner of using the WLAN by the UE, thereby resolving a problem that UE cannot accurately select a WLAN network because current network information is not complete.

With reference to the second aspect, in a first possible implementation manner, the determining, according to the network class information, a manner of using the WLAN by the UE includes:

determining, according to the network class information and class information of a user using the UE, whether the UE is to access the WLAN.

In this solution, the class information of the user of the UE is further used together with the received network class information, so that it can be more accurately determined whether the UE is to access the WLAN.

With reference to the first possible implementation manner of the second aspect, in a second possible implementation manner, before the determining a manner of using the WLAN, the method further includes:

receiving the class information of the user of the UE in PerProviderSubscription.

This solution provides a manner of obtaining the class information of the user of the UE from the WLAN network-side device.

With reference to the first possible implementation manner of the second aspect, or the second possible implementation manner of the second aspect, in a third possible implementation manner, the class information of the user of the UE includes any one of the following information:

information used to indicate that the user of the UE is an adult;

information used to indicate that the user of the UE is a juvenile;

information used to indicate that the user of the UE is a child;

information used to indicate an age group of the user of the UE; or information used to indicate that the user of the UE is a student.

This solution provides optional solutions of the class information of the user of the UE.

With reference to the second aspect, in a fourth possible implementation manner, the determining, according to the network class information, a manner of using the WLAN by the UE includes:

determining, according to the network class information, and a class of an application run on the UE or a class of a website or a website address to be accessed by an application in the UE, whether the UE is to access the WLAN or run the application in the WLAN.

In this solution, the class of the application run on the UE is used together with the received network class information, to determine whether the UE is to access the WLAN or run the application in the WLAN, and the manner of using the WLAN by the UE may be determined according to the application run on the UE.

With reference to the fourth possible implementation manner of the second aspect, in a fifth possible implementation manner, the determining whether the UE is to access the WLAN or run the application in the WLAN includes:

accessing, by using the application run on the UE, an application programming interface API that is provided by an operating system of the UE and that is used to query the network class information of the WLAN, to obtain the network class information of the WLAN; and determining, according to the obtained network class information, whether the UE is to access the WLAN or run the application in the WLAN; or determining, according to the obtained network class information by using an operating system of the UE, whether the UE is to access the WLAN or run the application in the WLAN.

This solution provides a specific manner of determining whether the UE is to access the WLAN or run the application in the WLAN.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner of the second aspect, the receiving network class information of a WLAN includes:

after sending, to the WLAN network-side device, an Access Network Query Protocol ANQP query request for querying the network class information of the WLAN, receiving the network class information by receiving an ANQP query response that is sent by the WLAN network-side device in response to the ANQP query request, or receiving the network class information by using a beacon Beacon frame or a probe response Probe Response.

This solution provides a specific implementation manner of obtaining the network class information of the WLAN by the user-side device.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, or the sixth possible implementation manner of the second aspect, in a seventh possible implementation manner of the second aspect, the network class information includes one or more of the following information:

a banking level banking level, security transport security transport, no security assured No security assured, a level that access by a child is allowed child level, non-child access protection Non-child protection, age class Under1X, access to an access point being monitored Monitoring, no monitoring No Monitoring, or access to an access point being protected by a firewall Firewall protected.

This solution provides optional solutions of the network class information for different scenarios.

In summary, in the embodiments of the present invention, a WLAN network-side device sends network class information to a user-side device, so that the user-side device can determine, according to the received network class information, a manner of using a WLAN by UE. Therefore, the UE can obtain complete network information and accurately select a WLAN network.

DESCRIPTION OF EMBODIMENTS

Embodiments of the present invention provide a wireless local area network user-side device and an information processing method, to resolve a problem that UE cannot accurately select a WLAN network because current network information of a WLAN network is not complete.

The wireless local area network user-side device provided in the embodiments of the present invention includes: a first processing module, configured to receive network class information of a WLAN sent by a wireless local area network WLAN network-side device, and a second processing module, configured to determine, according to the network class information received by the first processing module, a manner of using the WLAN by user equipment UE corresponding to the user-side device.

Because the WLAN user-side device provided in the embodiments of the present invention receives network class information of a WLAN sent by a WLAN network-side device, the user-side device can determine, according to the network class information, a manner of using the WLAN by UE corresponding to the user-side device, achieving an objective of accurately selecting a WLAN according to network class information of a WLAN.

The following describes the embodiments of the present invention in detail with reference to accompanying drawings. For ease of clarity, the embodiments of the present invention are first described from the perspective of a WLAN system. A WLAN network-side device, a WLAN user-side device, and two WLAN information processing methods provided in the embodiments of the present invention are then described.

Figure 2:
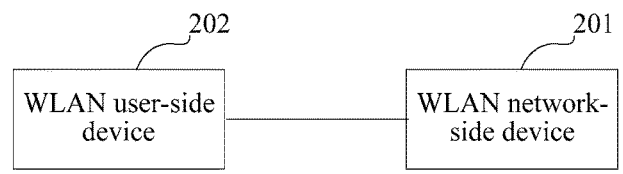
FIG. 2 is a schematic structural diagram of a WLAN system according to an embodiment of the present invention.

FIG. 2 is a schematic structural diagram of a WLAN system according to an embodiment of the present invention. As shown in FIG. FIG. 2, the WLAN system includes: a WLAN network-side device 201 and a WLAN user-side device 202, where the WLAN network-side device 201 is configured to send network class information of a WLAN to the WLAN user-side device 202; and the WLAN user-side device 202 is configured to receive the network class information of the WLAN sent by the network-side device 201, and determine, according to the received network class information, a manner of using the WLAN by UE corresponding to the user-side device 202.

In FIG. 2, although the WLAN network-side device 201 and the WLAN user-side device 202 are connected by using a solid line, it does not indicate that wired communication is performed between the WLAN network-side device 201 and the WLAN user-side device 202. In fact, a person skilled in the art knows that communication between the WLAN network-side device and the WLAN user-side device is generally performed wirelessly.

Herein, the WLAN network-side device 201 may be an access point of the WLAN, or may be an access control point (AC) managing and controlling access points of the WLAN. The WLAN user-side device 202 may be user equipment (UE) of the WLAN, or may be a control device that is externally connected to UE of the WLAN and that may be configured to perform WLAN access control on the UE.

In the following description, the description is provided by using an example in which an access point is used as the WLAN network-side device 201, and UE is used as the WLAN user-side device 202.

In the WLAN system shown in the FIG. 2, the WLAN may be classified by using different WLAN identifiers, such as a service set identifier (SSID), a basic service set identifier (BSSID), a realm (Realm), an organization identifier (OI), a fully qualified domain name (FQDN), and a venue name.

In the system shown in FIG. 2, multiple manners are available for the access point to determine the network class information of the WLAN to which the access point belongs, and include but are not limited to the following manners:

Manner 1: When a WLAN network is deployed, a memory is configured on the access point, and the access point may obtain the network class information of the WLAN by reading the memory, configured to store the network class information, of the access point.

For Manner 1, the access point may send the network class information of the WLAN to the UE by using a beacon Beacon frame, or after receiving a probe request Probe Request sent by the UE, send the network class information of the WLAN to the UE by using a probe response Probe Response.

Figure 1:
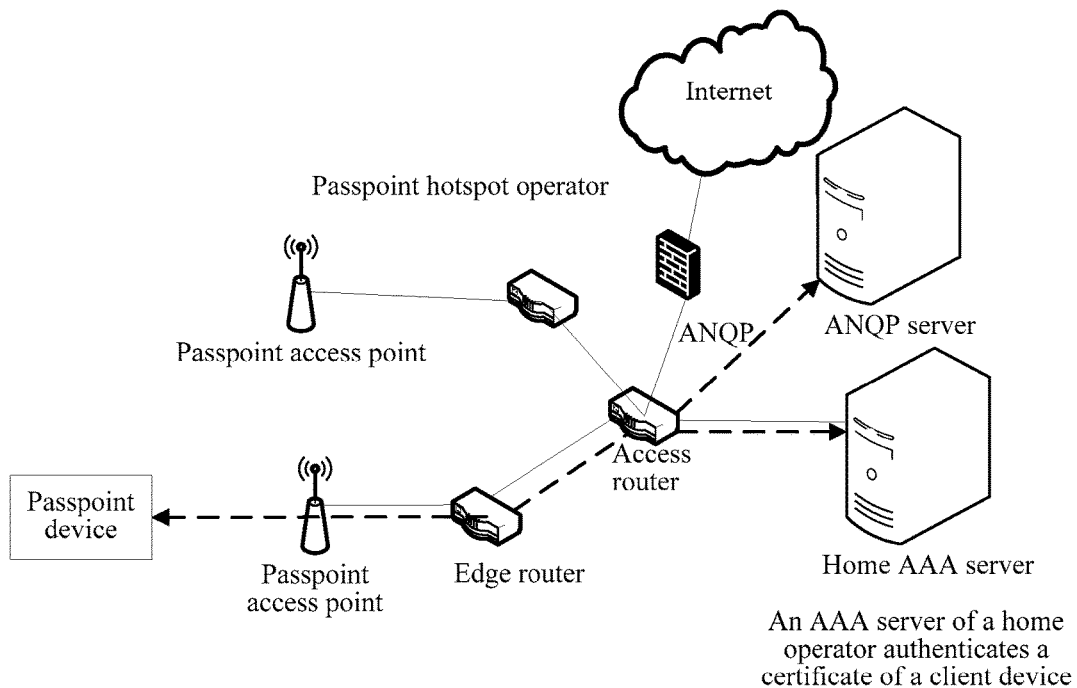
FIG. 1 is a diagram of a basic architecture of Hotspot 2.0.

Manner 2: The access point sends, to an ANQP server shown in FIG. 1, an ANQP query request that is received from the UE and that is used to query the network class information of the WLAN, and obtains the network class information of the WLAN in an ANQP query response returned from the ANQP server.

For Manner 2, after obtaining the network class information of the WLAN, the access point sends, to the UE, the ANQP query response including the network class information of the WLAN.

Optionally, the network class information includes two structures:

Structure 1: There is only first-level network class information.

Structure 2: There may be first-level network class information and second-level network class information that further classifies the first-level network class information.

For the foregoing two structures, optionally, the first-level network class information may include but is not limited to one or more of the following information:

a banking level banking level, security transport security transport, no security assured No security assured, a level that access by a child is allowed child level, non-child access protection Non-child protection, age class Under1X, access to an access point being monitored Monitoring, no monitoring No Monitoring, or access to an access point being protected by a firewall Firewall protected.

Herein, in some scenarios, not all network class information appears simultaneously. For example, either access to an access point being monitored Monitoring or no monitoring No Monitoring can appear; either security transport security transport or no security assured No security assured can appear.

Some other network class information may appear simultaneously. For example, a banking level banking level and security transport security transport may appear simultaneously; no security assured No security assured and a level that access by a child is allowed child level may appear simultaneously.

Figure 3:
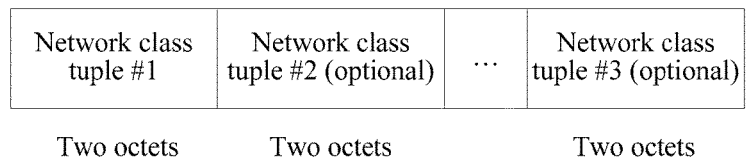
FIG. 3 is a schematic diagram of a data organizing manner of first-level network class information according to an embodiment of the present invention.

For Structure 1 and Structure 2, when the access point sends the first-level network class information to the UE, optionally, a data organizing manner shown in FIG. 3 may be used, where a level of network class information is represented by a network class tuple (NetworkClassTuple). As described above, the first-level network class information includes at least one or more of the information. Therefore, a network class tuple #2 and a network class tuple #3 that are shown in FIG. 3 are optional (optional). A data length of each network class tuple is two octets (octet).

Figure 4:
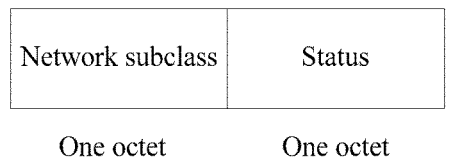
FIG. 4 is a schematic diagram of a data organizing manner of second-level network class information according to an embodiment of the present invention.

The second-level network class information in Structure 2 is required only to further classify the first-level network class information, and a data organizing manner may be shown in FIG. 4, where the second-level network class information may be represented by a network subclass (NetworkSubClass) and a corresponding status (status), the network subclass and the status each occupy one octet, and specific information content and a specific implementation manner of the second-level network class information are not limited. For example, for a value and meaning of the network subclass, refer to Table 1 below, and for a value and meaning of the status, refer to Table 2 below.

TABLE 1

| Network subclass | Description |
| --- | --- |
| 1 | Child protection (Child protection) |
| 2 | Banking security (Bank Service Security) |
| 3 | Monitoring running (Monitoring running) |
| 4 | Firewall running (Firewall running) |
| 0 and 5 to 255 | Reserved (Reserved) |

TABLE 2

| Network subclass | Description |
| --- | --- |
| 0 | Child content protected (Child content protected) |
| 1 | Under year 21 protected (Under year 21 protected) |
| 2 | All adult content permitted (All adult content permitted) |
| 3 to 255 | Reserved (Reserved) |

In the system shown in FIG. 2, the UE determines, according to the network class information of the WLAN received from the access point, the manner of using the WLAN.

Specifically, the UE may perform the following determining according to the network class information:

Determining 1: Whether to access the WLAN.

Determining 2: Whether to run a particular application in the UE in the WLAN.

Specifically, for Determining 1, the UE may determine, according to the received network class information and class information of a user using the UE, whether to access the WLAN (refer to Embodiment 1 and Embodiment 2 below).

Optionally, the class information of the user using the UE is pre-configured in the UE (for example, the UE is customized user equipment), or is configured and managed by using an application installed in the UE (refer to Embodiment 2 below).

Alternatively, the UE may use multiple manners including the following manner, to obtain the class information of the user of the UE by receiving information from the access point.

The class information of the user of the UE is obtained from received PerProviderSubscription sent by the network side to the UE (refer to Embodiment 1 below).

The PerProviderSubscription is also pre-configured information, and where the UE specifically obtains the information is not limited herein, that is, the UE may receive the information from the access point obtaining the network class information of the WLAN, or may receive the information from another access point.

Optionally, the class information of the user of the UE includes any one of the following information:

information used to indicate that the user of the UE is an adult;

information used to indicate that the user of the UE is a juvenile;

information used to indicate that the user of the UE is a child;

information used to indicate an age group of the user of the UE; or information used to indicate that the user of the UE is a student.

For Determining 2, specifically, the UE may determine, according to the network class information, and a class of an application run on the UE or a class of a website or a website address to be accessed by an application run on the UE, whether to access the WLAN or whether to run the application in the WLAN (refer to Embodiment 3, Embodiment 4, and Embodiment 5 below).

Determining 2 may be specifically implemented in the following two manners:

Manner 1: The application run on the UE determines, according to the received network class information, whether to access the WLAN or whether to run the application in the WLAN.

For Manner 1, optionally, the application may obtain, by using an application programming interface API that is provided by an operating system of the UE and that is used to query the network class information of the WLAN, the network class information of the WLAN received by the UE.

Manner 2: The operating system of the UE determines, according to the received network class information, whether to access the WLAN or whether to run the application in the WLAN.

Based on the same inventive concept, the embodiments of the present invention further provide a WLAN network-side device, a user-side device and two WLAN information processing methods. Because a principle for resolving a technical problem of the WLAN network-side device, the user-side device, and the two information processing methods provided in the embodiments of the present invention is similar to that of the WLAN system, for implementation of the principle, refer to the implementation of the WLAN system. Details are not described herein again.

Figure 5:
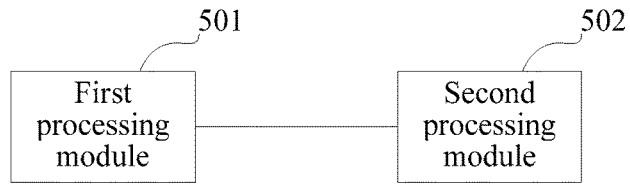
FIG. 5 is a schematic structural diagram of a WLAN user-side device according to an embodiment of the present invention.

FIG. 5 is a schematic structural diagram of a WLAN user-side device according to an embodiment of the present invention. As shown in FIG. 5, the user-side device includes:

a first processing module 501, configured to receive network class information of a WLAN sent by a wireless local area network WLAN network-side device; and a second processing module 502, configured to determine, according to the network class information received by the first processing module 501, a manner of using the WLAN by user equipment UE corresponding to the user-side device.

Optionally, the second processing module 502 is specifically configured to:

determine, according to the network class information and class information of a user using the UE, whether the UE is to access the WLAN.

Optionally, the first processing module 501 is further configured to:

receive the class information of the user of the UE in PerProviderSubscription sent by the WLAN network-side device.

Optionally, the class information of the user of the UE received by the first processing module 501 includes any one of the following information:

information used to indicate that the user of the UE is an adult;

information used to indicate that the user of the UE is a juvenile;

information used to indicate that the user of the UE is a child;

information used to indicate an age group of the user of the UE; or information used to indicate that the user of the UE is a student.

Optionally, the second processing module 502 is specifically configured to:

determine, according to the network class information, and a class of an application run on the UE or a class of a website or a website address to be accessed by an application run on the UE, whether the UE is to access the WLAN or run the application in the WLAN.

Optionally, the second processing module 502 is specifically configured to:

access, by using the application run on the UE, an application programming interface API that is provided by an operating system of the UE and that is used to query the network class information of the WLAN, to obtain the network class information of the WLAN received by the first processing module 501; and determine, according to the obtained network class information, whether the UE is to access the WLAN or run the application in the WLAN; or determine, according to the network class information received by the first processing module 501 and by using an operating system of the UE, whether the UE is to access the WLAN or run the application in the WLAN.

Optionally, the first processing module 501 is specifically configured to:

after sending, to the WLAN network-side device, an Access Network Query Protocol ANQP query request for querying the network class information of the WLAN, receive the network class information by using an ANQP query response that is sent by the WLAN network-side device in response to the ANQP query request, or receive the network class information by using a beacon Beacon frame or a probe response Probe Response.

Optionally, the network class information includes one or more of the following information:

a banking level banking level, security transport security transport, no security assured No security assured, a level that access by a child is allowed child level, non-child access protection Non-child protection, age class Under1X, access to an access point being monitored Monitoring, no monitoring No Monitoring, or access to an access point being protected by a firewall Firewall protected.

Figure 6:
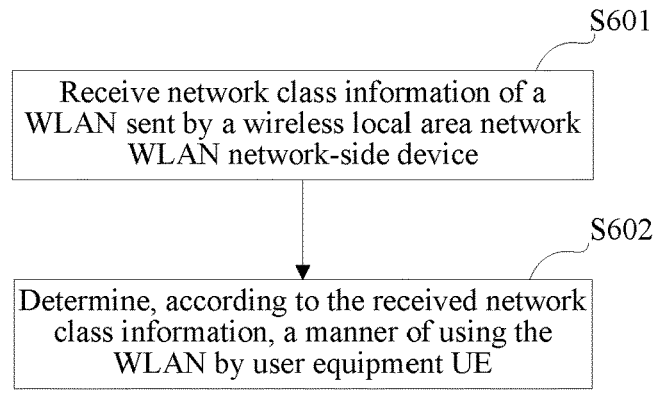
FIG. 6 is a flowchart of a first information processing method according to an embodiment of the present invention.

FIG. 6 is a flowchart of a first information processing method according to an embodiment of the present invention. As shown in FIG. 6, the method includes:

S601: Receive network class information of a WLAN sent by a wireless local area network WLAN network-side device.

S602: Determine, according to the received network class information, a manner of using the WLAN by user equipment UE.

Optionally, the determining, according to the network class information, a manner of using the WLAN by the UE in step S602 includes:

determining, according to the network class information and class information of a user using the UE, whether the UE is to access the WLAN.

Optionally, before the determining a manner of using the WLAN in step S602, the method further includes:

receiving the class information of the user of the UE in PerProviderSubscription sent by the WLAN network-side device.

Optionally, the class information of the user of the UE includes any one of the following information:

information used to indicate that the user of the UE is an adult;

information used to indicate that the user of the UE is a juvenile;

information used to indicate that the user of the UE is a child;

information used to indicate an age group of the user of the UE; or information used to indicate that the user of the UE is a student.

Optionally, the determining, according to the network class information, a manner of using the WLAN by the UE in step S602 includes:

determining, according to the network class information, and a class of an application run on the UE or a class of a website or a website address to be accessed by an application run on the UE, whether the UE is to access the WLAN or run the application in the WLAN.

Optionally, the determining whether the UE is to access the WLAN or run the application in the WLAN includes:

accessing, by using the application run on the UE, an application programming interface API that is provided by an operating system of the UE and that is used to query the network class information of the WLAN, to obtain the network class information of the WLAN; and determining, according to the obtained network class information, whether the UE is to access the WLAN or run the application in the WLAN; or determining, according to the obtained network class information by using an operating system of the UE, whether the UE is to access the WLAN or run the application in the WLAN.

Optionally, the receiving network class information of a WLAN in step S601 includes:

after sending, to the WLAN network-side device, an Access Network Query Protocol ANQP query request for querying the network class information of the WLAN, receive the network class information by receiving an ANQP query response that is sent by the WLAN network-side device in response to the ANQP query request, or receiving the network class information by using a beacon Beacon frame or a probe response Probe Response.

Optionally, the network class information includes one or more of the following information:

a banking level banking level, security transport security transport, no security assured No security assured, a level that access by a child is allowed child level, non-child access protection Non-child protection, age class Under1X, access to an access point being monitored Monitoring, no monitoring No Monitoring, or access to an access point being protected by a firewall Firewall protected.

Figure 7:
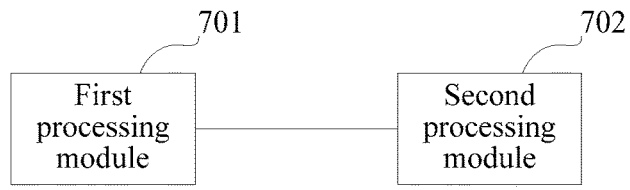
FIG. 7 is a schematic structural diagram of a WLAN network-side device according to an embodiment of the present invention.

FIG. 7 is a schematic structural diagram of a WLAN network-side device according to an embodiment of the present invention. As shown in FIG. 7, the network-side device includes:

a first processing module 701, configured to determine network class information of a WLAN to which the network-side device belongs; and a second processing module 702, configured to send, to a WLAN user-side device, the network class information determined by the first processing module 701, so that the user-side device determines, according to the received network class information, a manner of using the WLAN by user equipment UE corresponding to the user-side device.

Optionally, the second processing module 702 is specifically configured to:

after receiving an Access Network Query Protocol ANQP query request that is sent by the user-side device and that is used to query the network class information of the WLAN, send the network class information to the user-side device by using an ANQP query response for responding to the ANQP query request, or sending the network class information to the UE by using a beacon Beacon frame or a probe response Probe Response.

Optionally, the network class information determined by the first processing module 701 includes first-level network class information, or includes first-level network class information and second-level network class information that further classifies the first-level network class information.

Optionally, the first-level network class information determined by the first processing module 701 includes one or more of the following information:

a banking level banking level, security transport security transport, no security assured No security assured, a level that access by a child is allowed child level, non-child access protection Non-child protection, age class Under1X, access to an access point being monitored Monitoring, no monitoring No Monitoring, or access to an access point being protected by a firewall Firewall protected.

Optionally, the second processing module 702 is further configured to send, to the user-side device, class information of a user of the UE corresponding to the user-side device; and the second processing module 702 is specifically configured to send the network class information to the user-side device, so that the user-side device determines, according to the received network class information and class information of the user of the UE, whether the UE is to access the WLAN.

Optionally, the second processing module 702 is specifically configured to:

send the class information of the user of the UE to the user-side device by using PerProviderSubscription.

Optionally, the class information of the user of the UE sent by the second processing module 702 to the user-side device includes any one of the following information:

information used to indicate that the user of the UE is an adult;

information used to indicate that the user of the UE is a juvenile;

information used to indicate that the user of the UE is a child;

information used to indicate an age group of the user of the UE; or information used to indicate that the user of the UE is a student.

Figure 8:
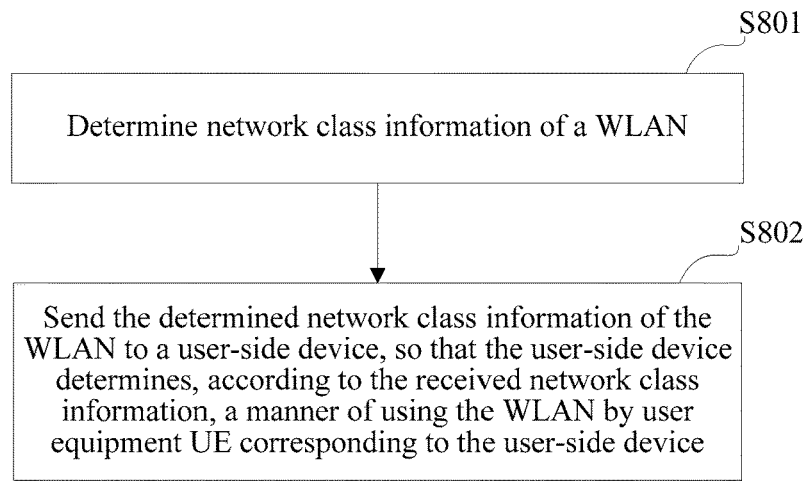
FIG. 8 is a flowchart of a second information processing method according to an embodiment of the present invention.

FIG. 8 is a flowchart of a second information processing method according to an embodiment of the present invention. As shown in FIG. 8, the method includes:

S801: Determine network class information of a WLAN.

S802: Send the determined network class information of the WLAN to a user-side device, so that the user-side device determines, according to the received network class information, a manner of using the WLAN by user equipment UE corresponding to the user-side device.

Optionally, the sending the network class information to a user-side device in step S802 includes:

after receiving an Access Network Query Protocol ANQP query request that is sent by the user-side device and that is used to query the network class information of the WLAN, sending the network class information to the user-side device by using an ANQP query response for responding to the ANQP query request, or sending the network class information to the user-side device by using a beacon Beacon frame or a probe response Probe Response.

Optionally, the network class information includes first-level network class information, or the network class information includes first-level network class information and second-level network class information that further classifies the first-level network class information.

Optionally, the first-level network class information includes one or more of the following information:

a banking level banking level, security transport security transport, no security assured No security assured, a level that access by a child is allowed child level, non-child access protection Non-child protection, age class Under1X, access to an access point being monitored Monitoring, no monitoring No Monitoring, or access to an access point being protected by a firewall Firewall protected.

Optionally, the method further includes:

sending the class information of the user of the UE to the user-side device; and the sending the determined network class information of the WLAN to a user-side device, so that the user-side device determines, according to the received network class information, a manner of using the WLAN by UE in step S802 includes:

sending the network class information to the user-side device, so that the user-side device determines, according to the received network class information and class information of the user of the UE, whether the UE is to access the WLAN.

Optionally, the sending the class information of the user of the UE to the user-side device in step S802 includes:

sending the class information of the user of the UE to the user-side device by using PerProviderSubscription.

Optionally, the class information of the user of the UE includes any one of the following information:

information used to indicate that the user of the UE is an adult;

information used to indicate that the user of the UE is a juvenile;

information used to indicate that the user of the UE is a child;

information used to indicate an age group of the user of the UE; or information used to indicate that the user of the UE is a student.

The present invention is exemplarily described below by using specific Embodiment 1, Embodiment 2, Embodiment 3, Embodiment 4, and Embodiment 5.

Embodiment 1

In Embodiment 1, class information of a user of UE is added to PerProviderSubscription that is sent by a network side to the UE by using an access point of a WLAN. For example, when a user signs up, the network side may obtain age information of the user of the UE that signs up, and may set, according to the subscription information, a class of the user in the PerProviderSubscription sent to the UE to "child", "under year 21 (U21)", "adult", or the like.

After obtaining the class information of the user of the UE from the PerProviderSubscription received from the access point, the UE determines, according to network class information of the WLAN received from the access point, whether to access the WLAN. For example, if the class of the user of the UE is "child" or "U21", and the UE determines, according to the received network class information of the WLAN, that the WLAN is a network that is not allowed to be used by this class of user (for example, the network class information is non-child access protection Non-child protection), the UE determines not to access the WLAN.

Embodiment 2

Embodiment 2 is a variation of Embodiment 1, and a difference from Embodiment 1 is: Class information of a user of UE is pre-configured in the UE (for example, the UE is customized user equipment) or is configured and managed by using an application installed in the UE.

The class information of the user of the UE may be recorded in a registry. When a wireless network connection application run on the UE attempts to connect to a WLAN, the application queries the class information of the user of the UE by using an API that is provided by an operating system and that is used to query the class information of the user of the UE, the operating system sends, to the application by using the API, the class information of the user of the UE read from the registry, and the application determines, according to the obtained class information of the user of the UE and network class information of the WLAN to be accessed by the UE, whether the UE is to access the WLAN. If the application determines that the WLAN cannot be accessed, the application may prompt the user that the WLAN is not proper to access, and may prompt a cause of access failure.

Alternatively, similarly, the class information of the user of the UE may be recorded in the registry. When the operating system in the UE detects that the wireless network connection application run on the UE attempts to connect to a WLAN, the operating system reads the class information of the user of the UE from the registry, and according to network class information of the WLAN to be connected and the obtained class information of the user of the UE, the operating system determines whether the UE is to access the WLAN. If the operating system determines that the WLAN cannot be accessed, the operating system may prompt the user that the WLAN is not proper to access, and may prompt a cause of access failure.

Embodiment 3

Before or after UE is connected to a WLAN, the UE obtains network class information of the WLAN from an access point of the WLAN.

When a banking service is started, and the UE selects which WLAN is to be accessed, the UE selects, according to obtained network class information of WLANs, a WLAN supporting the banking service (for example, the network class information is a "banking level banking level") for access.

Embodiment 4

When UE is connected to a WLAN, the UE obtains network class information of the WLAN from an access point of the WLAN.

When a banking service in the UE is started (which may be started by a user of the UE), the UE displays the network class information of the WLAN to the user of the UE, so that the user of the UE determines whether to run the banking service in the WLAN.

Alternatively, the UE prompts, according to the network class information of the WLAN, the user of the UE whether the banking service is proper to run in the WLAN.

Alternatively, the UE determines, according to the network class information of the WLAN, that the banking service is not proper to run in the WLAN, and directly prevents starting of the banking service, or prevents the banking service from establishing a connection to a bank server by using the WLAN, and notifies the user of the UE of a cause.

Embodiment 5

When UE is connected to a WLAN, the UE obtains network class information of the WLAN from an access point of the WLAN.

An application that is run on the UE and that is related to a banking service obtains, when the application attempts to connect to a bank server by using the WLAN, the network class information of the WLAN by using an application programming interface API that is provided by an operating system of the UE and that is used to query the network class information of the WLAN, and the application determines, according to the obtained network class information of the WLAN, whether the application related to the banking service is proper to run in the WLAN. If the application is not proper to run in the WLAN, the application may prompt the user that the banking service is not proper to run in the currently connected WLAN, and optionally, may display, to the user, the network class information of the currently connected WLAN for reference of the user.

Alternatively, the operating system of the UE determines, according to the obtained network class information of the WLAN, whether the application related to the banking service is proper to run in the WLAN. If the application is not proper to run in the WLAN, the operating system may prompt the user that the banking service is not proper to run in the currently connected WLAN, and optionally, may display, to the user, the network class information of the currently connected WLAN for reference of the user.

In summary, in the embodiments of the present invention, a WLAN network-side device sends network class information to a user-side device, so that the user-side device can determine, according to the received network class information, a manner of using a WLAN by UE. Therefore, the UE can obtain complete network information and accurately select a WLAN network.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A wireless local area network (WLAN) user-side device configured to determine whether to use a WLAN in a particular manner to communicate over a network based upon class information provided by a WLAN network-side device, the WLAN user-side device comprising:
 a processor; and
 a non-transitory computer-readable medium including computer-executable instructions that, when executed by the processor, facilitate the user-side device carrying out a method comprising:
   receiving a network class information of the WLAN provided by the WLAN network-side device;
   determining, according to the network class information of the WLAN, whether a user of a user equipment (UE) corresponding to the user-side device can use the WLAN in a particular manner,
   wherein the particular manner of using the WLAN comprises accessing a particular type of service provided to the UE by a network server using a connection including a wireless link corresponding to the WLAN, wherein the method carried out by the user-side device, based upon class information provided by a WLAN network-side device, further comprises:
receiving a user class information of the user of the UE in a configuration information sent by the WLAN network-side device, and
wherein the determining the particular manner of using the WLAN comprises determining the particular manner of using the WLAN according to both the network class information of the WLAN and the user class information of the user of the UE, and
wherein the user class information of the user of the UE comprises information taken from the group consisting of:
information used to indicate that the user of the UE is an adult;
information used to indicate that the user of the UE is a juvenile;
information used to indicate that the user of the UE is a child;
information used to indicate an age group of the user of the UE; and
information used to indicate that the user of the UE is a student.

2. The user-side device according to claim 1, wherein the user class information is provided to the user-side device in a PerProviderSubscription.

3. The user-side device according to claim 1, wherein the class information provided by a WLAN network-side device comprises class information taken from the group consisting of: an application class of an application run on the UE, a website class accessed by an application run on the UE, and a network address class accessed by an application run on the UE.

4. The user-side device according to claim 3, wherein the determining the particular manner of using the WLAN further comprises:
accessing, by using the application run on the UE, an application programming interface API that is provided by an operating system of the UE and that is used to:
query the network class information of the WLAN, and
obtain the network class information of the WLAN; and
wherein the network class information of the WLAN is either:
obtained by the UE in response to the query, or
provided by the WLAN network-side device and by using an operating system of the UE.

5. A wireless local area network (WLAN) user-side device configured to determine whether to use a WLAN in a particular manner to communicate over a network based upon class information provided by a WLAN network-side device, the WLAN user-side device comprising:
a processor; and
a non-transitory computer-readable medium including computer-executable instructions that, when executed by the processor, facilitate the user-side device carrying out a method comprising:
receiving a network class information of the WLAN provided by the WLAN network-side device;
determining, according to the network class information of the WLAN, whether a user of a user equipment (UE) corresponding to the user-side device can use the WLAN in a particular manner,
wherein the particular manner of using the WLAN comprises accessing a particular type of service provided to the UE by a network server using a connection including a wireless link corresponding to the WLAN, and
wherein the method comprises obtaining the network class information by performing one of the group consisting of:
receiving the network class information in an Access Network Query Protocol (ANQP) query response sent by the WLAN network-side device in response to the UE sending, to the WLAN network-side device, an ANQP query request for the network class information of the WLAN;
receiving the network class information using a beacon frame; and
receiving the network class information in a probe response.

6. The user-side device according to claim 5, wherein the class information provided by a WLAN network-side device comprises class information taken from the group consisting of: an application class of an application run on the UE, a website class accessed by an application run on the UE, and a network address class accessed by an application run on the UE.

7. The user-side device according to claim 6, wherein the determining the particular manner of using the WLAN further comprises:
accessing, by using the application run on the UE, an application programming interface API that is provided by an operating system of the UE and that is used to:
query the network class information of the WLAN, and
obtain the network class information of the WLAN; and
wherein the network class information of the WLAN is either:
obtained by the UE in response to the query, or
provided by the WLAN network-side device and by using an operating system of the UE.

8. A wireless local area network (WLAN) user-side device configured to determine whether to use a WLAN in a particular manner to communicate over a network based upon class information provided by a WLAN network-side device, the WLAN user-side device comprising:
a processor; and
a non-transitory computer-readable medium including computer-executable instructions that, when executed by the processor, facilitate the user-side device carrying out a method comprising:
receiving a network class information of the WLAN provided by the WLAN network-side device;
determining, according to the network class information of the WLAN, whether a user of a user equipment (UE) corresponding to the user-side device can use the WLAN in a particular manner,
wherein the particular manner of using the WLAN comprises accessing a particular type of service provided to the UE by a network server using a connection including a wireless link corresponding to the WLAN, and
wherein the network class information comprises information of one or more types taken from the group consisting of:
a banking level, security transport, no security assured, a level that access by a child is allowed, non-child access protection, age class: Under1X, access to an access point being monitored, no monitoring, or access to an access point being protected by a firewall.

9. The user-side device according to claim 8, wherein the class information provided by a WLAN network-side device comprises class information taken from the group consisting of: an application class of an application run on the UE, a website class accessed by an application run on the UE, and a network address class accessed by an application run on the UE.

10. The user-side device according to claim 9, wherein the determining the particular manner of using the WLAN further comprises:
accessing, by using the application run on the UE, an application programming interface API that is provided by an operating system of the UE and that is used to: query the network class information of the WLAN, and obtain the network class information of the WLAN; and
wherein the network class information of the WLAN is either:
obtained by the UE in response to the query, or
provided by the WLAN network-side device and by using an operating system of the UE.

11. A method, carried out by a wireless local area network (WLAN) user-side device, for determining whether to use a WLAN in a particular manner to communicate over a network based upon class information provided by a WLAN network-side device, wherein the method comprises:
receiving a network class information of a WLAN provided by the WLAN network-side device, and
determining, according to the network class information of the WLAN, whether a user of a user equipment (UE) corresponding to the user-side device can user the WLAN in a particular manner,
wherein the particular manner of using the WLAN comprises accessing a particular type of service provided to the UE by a network server using a connection including a wireless link corresponding to the WLAN,
wherein the method carried out by the user-side device, based upon class information provided by a WLAN network-side device, further comprises:
receiving a user class information of the user of the UE in a configuration information sent by the WLAN network-side device, and
wherein the determining the particular manner of using the WLAN by UE comprises determining the particular manner of using the WLAN according to both the network class information of the WLAN and the user class information of the user of the UE, and
wherein the user class information of the user of the UE comprises information taken from the group consisting of:
information used to indicate that the user of the UE is an adult;
information used to indicate that the user of the UE is a juvenile;
information used to indicate that the user of the UE is a child;
information used to indicate an age group of the user of the UE; and
information used to indicate that the user of the UE is a student.

12. The method according to claim 11, wherein before the determining the particular manner of using the WLAN, the method further comprises:
receiving, by the user-side device, the user class information of the user of the UE in a PerProviderSubscription.

13. The method according to claim 11, wherein the class information provided by a WLAN network-side device comprises class information taken from the group consisting of: an application class of an application run on the UE, a website class accessed by an application run on the UE, and a network address class accessed by an application run on the UE.

14. The method according to claim 13, wherein the determining the particular manner of using the WLAN further comprises:
accessing, by using the application run on the UE, an application programming interface API that is provided by an operating system of the UE and that is used to: query the network class information of the WLAN, and obtain the network class information of the WLAN; and
wherein the network class information of the WLAN is either:
obtained by the UE in response to the query, or
provided by the WLAN network-side device and by using an operating system of the UE.

15. A method, carried out by a wireless local area network (WLAN) user-side device, for determining whether to use a WLAN in a particular manner to communicate over a network based upon class information provided by a WLAN network-side device, wherein the method comprises:
receiving a network class information of a WLAN provided by the WLAN network-side device, and
determining, according to the network class information of the WLAN, whether a user of a user equipment (UE) corresponding to the user-side device can user the WLAN in a particular manner,
wherein the particular manner of using the WLAN comprises accessing a particular type of service provided to the UE by a network server using a connection including a wireless link corresponding to the WLAN,
wherein the method comprises obtaining the network class information by performing one of the group consisting of:
receiving the network class information in an Access Network Query Protocol (ANQP) query response sent by the WLAN network-side device in response to the UE sending, to the WLAN network-side device, an ANQP query request for the network class information of the WLAN;
receiving the network class information using a beacon frame; and
receiving the network class information in a probe response.

16. The method according to claim 15, wherein the class information provided by a WLAN network-side device comprises class information taken from the group consisting of: an application class of an application run on the UE, a website class accessed by an application run on the UE, and a network address class accessed by an application run on the UE.

17. The method according to claim 16, wherein the determining the particular manner of using the WLAN further comprises:
accessing, by using the application run on the UE, an application programming interface API that is provided by an operating system of the UE and that is used to: query the network class information of the WLAN, and obtain the network class information of the WLAN; and
wherein the network class information of the WLAN is either:

obtained by the UE in response to the query, or
provided by the WLAN network-side device and by using an operating system of the UE.

18. A method, carried out by a wireless local area network (WLAN) user-side device, for determining whether to use a WLAN in a particular manner to communicate over a network based upon class information provided by a WLAN network-side device, wherein the method comprises:
receiving a network class information of a WLAN provided by the WLAN network-side device, and
determining, according to the network class information of the WLAN, whether a user of a user equipment (UE) corresponding to the user-side device can user the WLAN in a particular manner,
wherein the particular manner of using the WLAN comprises accessing a particular type of service provided to the UE by a network server using a connection including a wireless link corresponding to the WLAN,
wherein the network class information comprises information of one or more types taken from the group consisting of:
a banking level, security transport, no security assured, a level that access by a child is allowed, non-child access protection, age class: Under1X, access to an access point being monitored, no monitoring, or access to an access point being protected by a firewall.

19. The method according to claim 18, wherein the class information provided by a WLAN network-side device comprises class information taken from the group consisting of: an application class of an application run on the UE, a website class accessed by an application run on the UE, and a network address class accessed by an application run on the UE.

20. The method according to claim 19, wherein the determining the particular manner of using the WLAN further comprises:
accessing, by using the application run on the UE, an application programming interface API that is provided by an operating system of the UE and that is used to:
query the network class information of the WLAN, and
obtain the network class information of the WLAN; and
wherein the network class information of the WLAN is either:
obtained by the UE in response to the query, or
provided by the WLAN network-side device and by using an operating system of the UE.

* * * * *